United States Patent
Hornbach et al.

(10) Patent No.: US 8,590,074 B2
(45) Date of Patent: Nov. 26, 2013

(54) TRANSPORT APPARATUS

(75) Inventors: David W. Hornbach, Brookville, IN (US); Darrell L. Metz, Batesville, IN (US); John M. Johnson, Cincinnati, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 217 days.

(21) Appl. No.: 12/484,345

(22) Filed: Jun. 15, 2009

(65) Prior Publication Data

US 2009/0307844 A1    Dec. 17, 2009

Related U.S. Application Data

(60) Provisional application No. 61/061,473, filed on Jun. 13, 2008.

(51) Int. Cl.
*A61G 7/05* (2006.01)

(52) U.S. Cl.
USPC ........................................ 5/600; 5/86.1; 5/611

(58) Field of Classification Search
USPC .............................. 5/86.1, 611, 81.1 R, 600
See application file for complete search history.

(56) References Cited

U.S. PATENT DOCUMENTS

| | | | |
|---|---|---|---|
| 204,050 A | 5/1878 | Ladlow | |
| 320,365 A | 6/1885 | Kent | |
| 3,237,940 A * | 3/1966 | Johnson | 482/68 |
| 4,339,842 A | 7/1982 | Fontana et al. | |
| 4,385,414 A | 5/1983 | Damico | |
| 4,489,449 A | 12/1984 | Failor et al. | |
| 4,494,272 A | 1/1985 | Morita | |
| 4,646,371 A | 3/1987 | Nowell | |
| 4,828,208 A | 5/1989 | Peterson et al. | |
| 5,042,622 A | 8/1991 | Smith et al. | |
| 5,112,044 A | 5/1992 | Dubats | |
| 5,566,788 A | 10/1996 | Smith et al. | |
| 5,950,749 A | 9/1999 | Inoue | |
| 6,112,349 A | 9/2000 | Connolly | |
| 6,219,881 B1 | 4/2001 | Wen | |
| 6,240,579 B1 * | 6/2001 | Hanson et al. | 5/86.1 |
| 6,260,220 B1 | 7/2001 | Lamb et al. | |
| 6,269,499 B1 | 8/2001 | Amir | |
| 6,279,199 B1 | 8/2001 | Plate | |
| 6,351,861 B1 * | 3/2002 | Shows et al. | 5/618 |

(Continued)

FOREIGN PATENT DOCUMENTS

| | | |
|---|---|---|
| CA | 2669506 A1 | 5/2008 |
| DE | 102007039208 A1 | 5/2008 |

(Continued)

OTHER PUBLICATIONS

European Search Report, Application No. EP09251543, Place of Search—The Hague, Date of Completion—Mar. 30, 2011.

*Primary Examiner* — Fredrick Conley
(74) *Attorney, Agent, or Firm* — Jason Penninger

(57) ABSTRACT

An apparatus comprises a frame and a transport assembly supporting the frame. The transport assembly is configured to selectively move relative to the frame between a transport position and a brake position. A portion of the frame frictionally engages a portion of the transport assembly in the brake position to affect a brake application that resists the transportation of the frame. The portion of the frame is disengaged from the portion of the transport assembly in the transport position to allow for transportation of the frame.

19 Claims, 11 Drawing Sheets

(56) References Cited

U.S. PATENT DOCUMENTS

| | | |
|---|---|---|
| 6,550,100 B2 | 4/2003 | Drucker et al. |
| 6,568,030 B1 | 5/2003 | Watanabe et al. |
| 6,640,363 B1 | 11/2003 | Pattee et al. |
| 6,817,363 B2 | 11/2004 | Biondo et al. |
| 6,862,759 B2 | 3/2005 | Hand et al. |
| 6,865,775 B2 | 3/2005 | Ganance |
| 6,874,181 B1 | 4/2005 | Connolly et al. |
| 6,938,301 B2 | 9/2005 | Brooke et al. |
| 7,017,228 B2 | 3/2006 | Silverstein et al. |
| 7,137,160 B2 | 11/2006 | Hand et al. |
| 7,159,278 B2 | 1/2007 | Hilger |
| 2003/0070233 A1 | 4/2003 | Ganance |
| 2004/0231098 A1 | 11/2004 | Deyerler |
| 2005/0060840 A1 | 3/2005 | Polevoy et al. |
| 2006/0010646 A1 | 1/2006 | Bushey |
| 2006/0075600 A1 | 4/2006 | Dominic et al. |
| 2006/0131110 A1 | 6/2006 | Chung |
| 2006/0143862 A1 | 7/2006 | Dominic et al. |
| 2007/0080030 A1 | 4/2007 | Kramer |
| 2007/0107161 A1 | 5/2007 | Hilger |
| 2007/0174966 A1 | 8/2007 | Lopez-Sansalvador |

FOREIGN PATENT DOCUMENTS

| | | |
|---|---|---|
| EP | 0846457 A2 | 6/1998 |
| EP | 1818037 A2 | 8/2007 |
| FR | 2916332 A1 | 11/2008 |
| JP | 2003025805 A | 1/2003 |
| JP | 2004082994 A | 3/2004 |
| JP | 2006011302 A | 1/2006 |
| WO | 2004030943 A2 | 4/2006 |

* cited by examiner

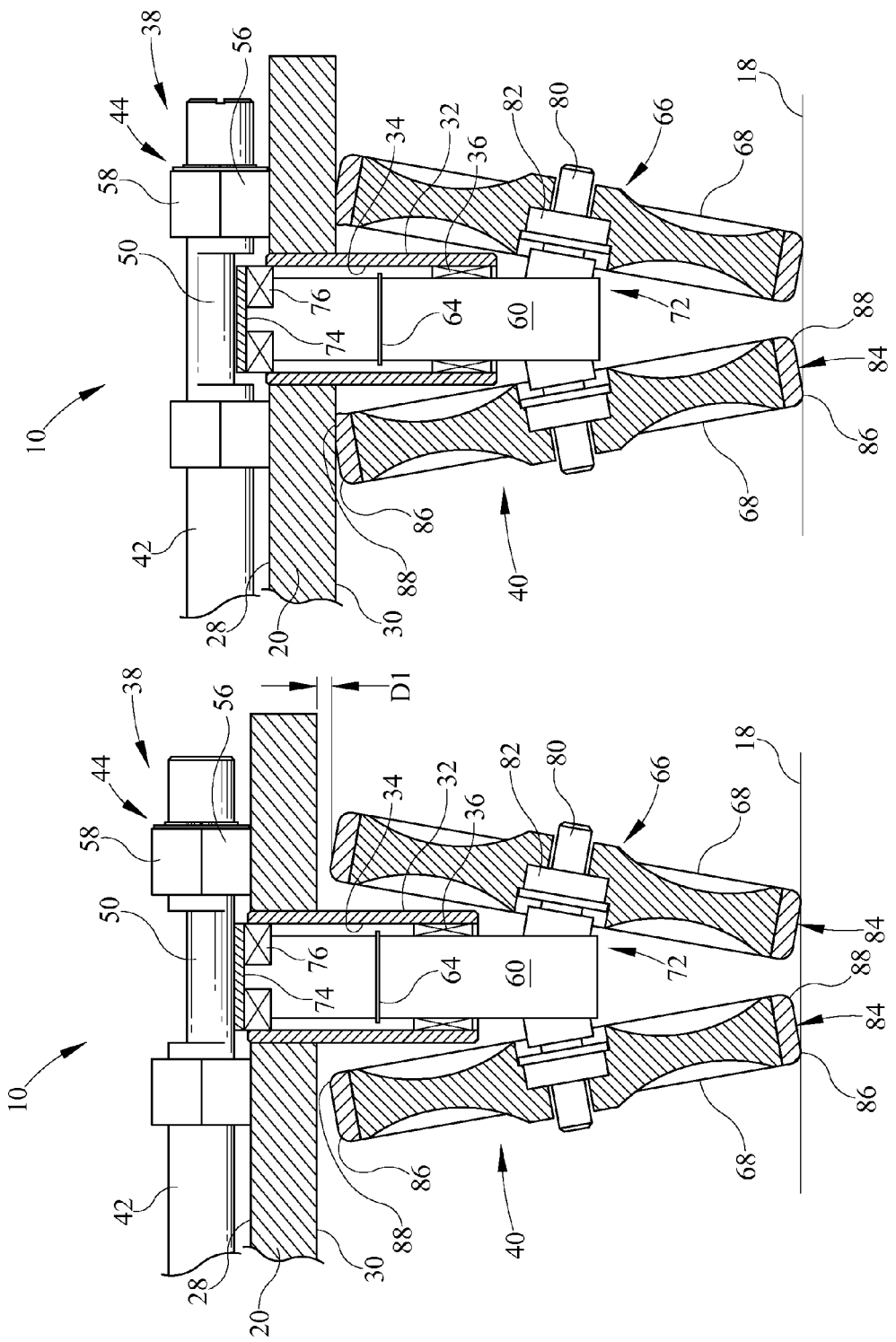

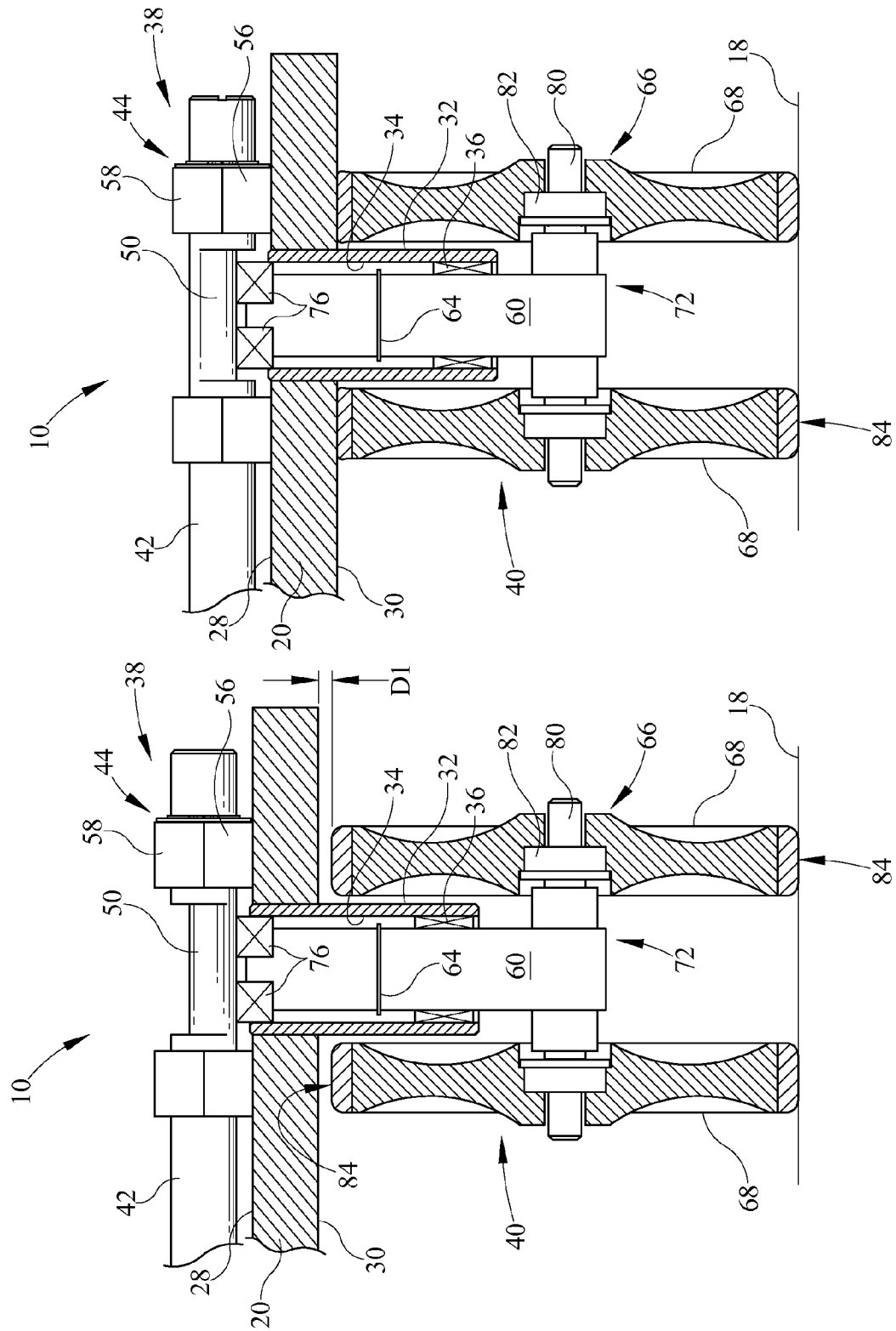

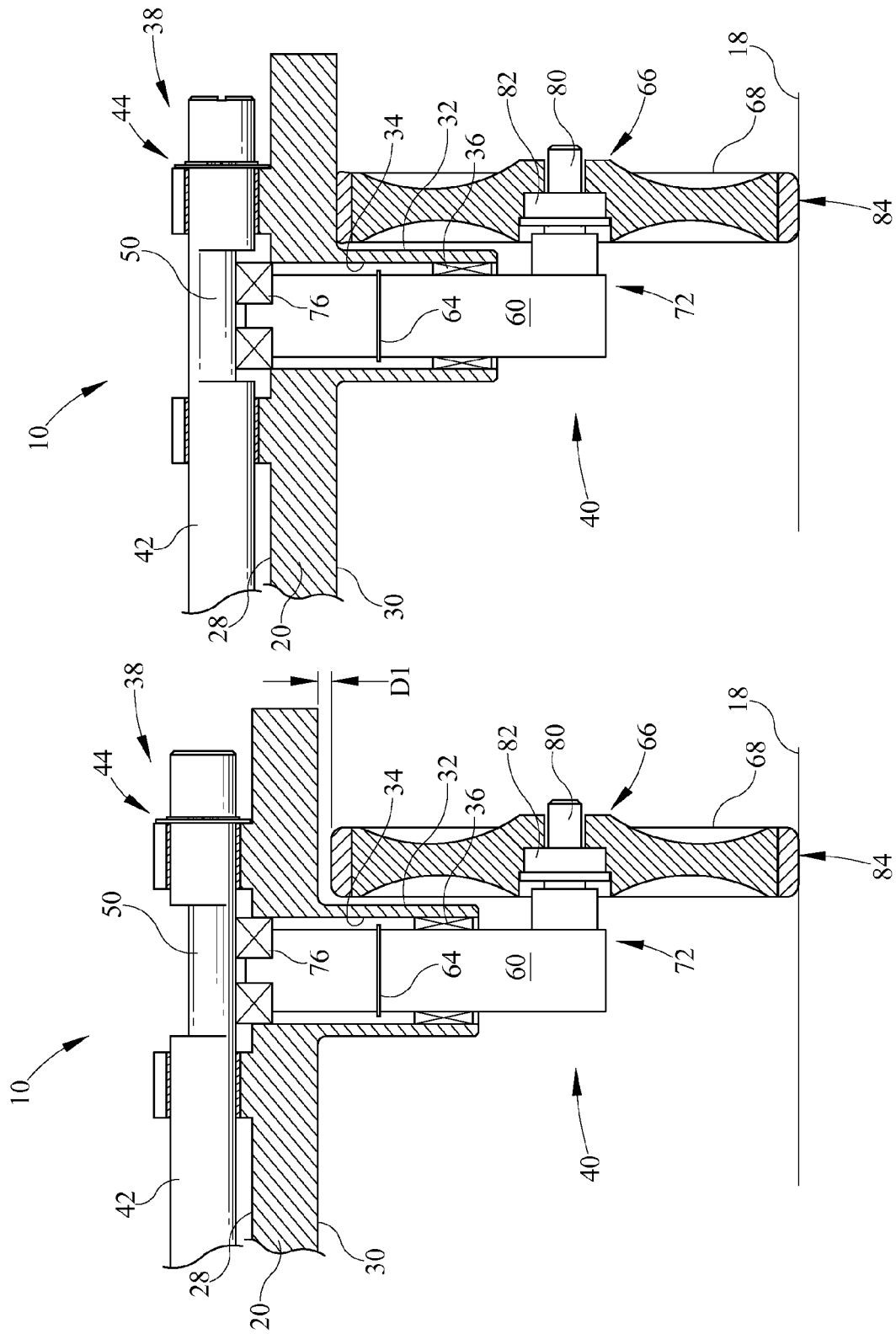

TRANSPORT APPARATUS

BACKGROUND

This disclosure relates generally to transport apparatuses. More particularly, but not exclusively, one embodiment relates to a patient support apparatus having caster assemblies that are movable with respect to a frame such that the frame frictionally engages the caster assemblies to affect a brake application.

Brake systems for patient support apparatuses can provide a braking force to stop or slow patient support apparatuses that are in motion, and/or can provide a force to prevent patient support apparatuses from being moved. However, some brake systems can substantially affect the height profile of the patient support apparatuses and, consequently, the ease with which patients can exit the patient support apparatuses. Also, some brake systems can cause significant wear and damage to the caster wheel portions that interface with the floor. Moreover, some such brake systems can require a substantial amount of force initially to move the patient support apparatuses from the stationary position (i.e., activation force), and/or can cause inadequate pressure to be exerted between the caster wheels and floor, which can affect the patient support apparatuses' mobility and ease of use. While various transport apparatuses and brake systems have been developed, there is still room for improvement. Thus, a need persists for further contributions in this area of technology.

SUMMARY

One illustrative embodiment can include a patient support apparatus supported on a transport apparatus configured to move with respect to a frame such that the frame selectively engages a rotational element to resist rotation of the rotational element, which can result in affecting a brake application. In other embodiments, a synchronization system can be configured to synchronize the movement of one or more transport apparatuses with respect to the frame, which can result in affecting a brake application.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

FIG. 3 is a cross-sectional front view of the transport apparatus of FIG. 1, the transport apparatus being shown in a first position or operating position with the caster wheels at an angle with respect to the caster shaft.

FIG. 4 is a cross-sectional front view of the transport apparatus of FIG. 3, the transport apparatus being shown in a second or rotation resisting (brake) position with the caster wheels at an angle with respect to the caster shaft.

FIG. 5 is a cross-sectional front view of the transport apparatus of FIG. 1, the transport apparatus being shown in a first position or operating position with the caster wheels parallel to the caster shaft.

FIG. 6 is a cross-sectional front view of the transport apparatus of FIG. 5, the transport apparatus being shown in a second or rotation resisting (brake) position with the caster wheels parallel to the caster shaft.

FIG. 7 is a cross-sectional front view of the transport apparatus of FIG. 1, the transport apparatus being shown in a first position or operating position with a single caster wheel parallel to the caster shaft.

FIG. 8 is a cross-sectional front view of the transport apparatus of FIG. 7, the transport apparatus being shown in a second or rotation resisting (brake) position with a single caster wheel parallel to the caster shaft.

DESCRIPTION OF SPECIFIC ILLUSTRATIVE EMBODIMENTS

Figure 1:
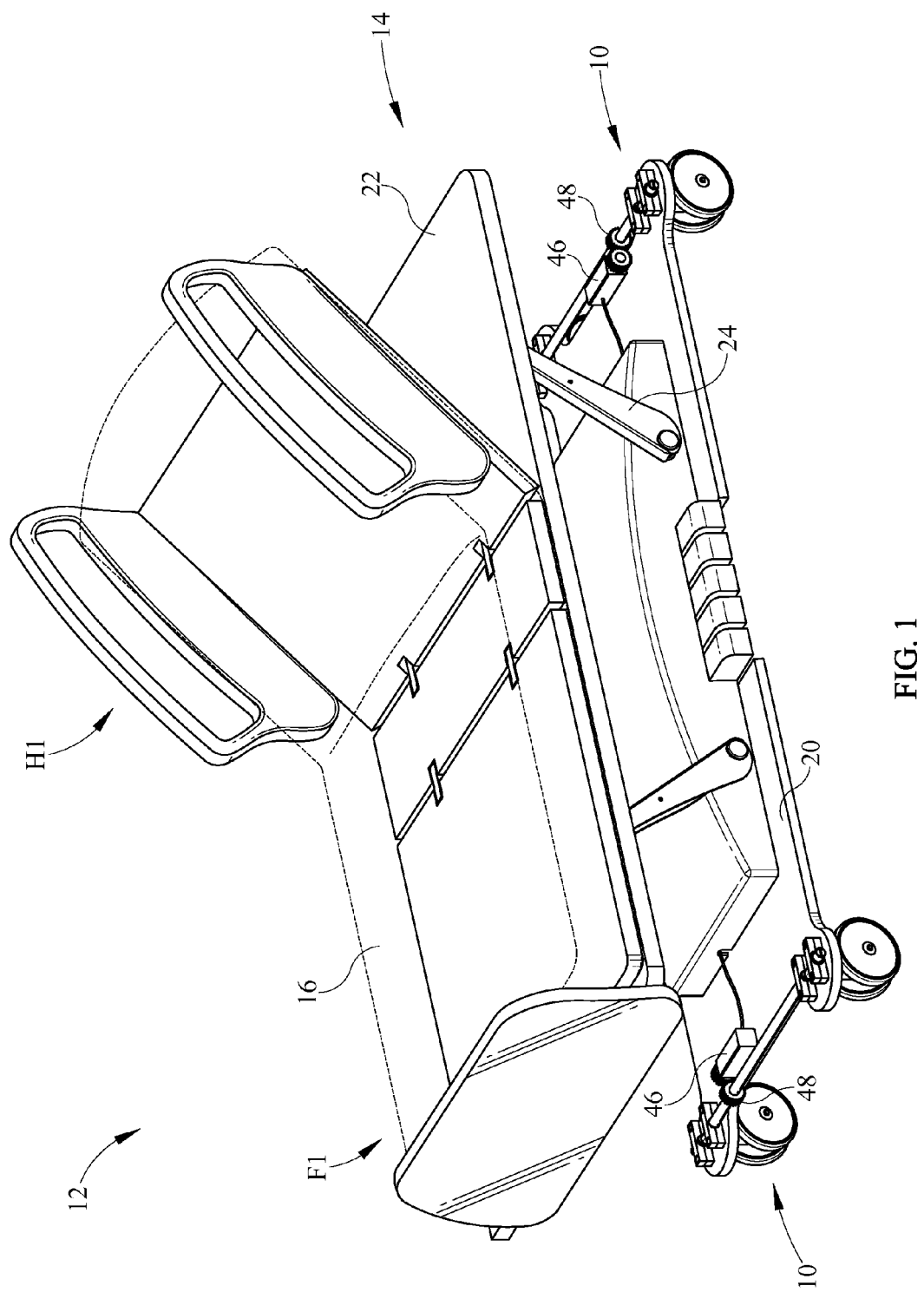
FIG. 1 is a perspective side view of a patient support apparatus including a plurality of transport apparatuses according to one illustrative embodiment.

While the present disclosure can take many different forms, for the purpose of promoting an understanding of the principles of the disclosure, reference will now be made to the illustrative embodiments shown in the drawings, and specific language will be used to describe the same. No limitation of the scope of the disclosure is thereby intended. Various alterations, further modifications of the described embodiments, and any further applications of the principles of the disclosure, as described herein, are contemplated.

One illustrative embodiment can include a patient support apparatus supported on a transport apparatus configured to move with respect to a frame such that the frame selectively engages a rotational element to resist rotation of the rotational element, which can result in affecting a brake application. In other embodiments, a synchronization system can be configured to synchronize the movement of one or more transport apparatuses with respect to the frame, which can result in affecting a brake application.

Figure 2:
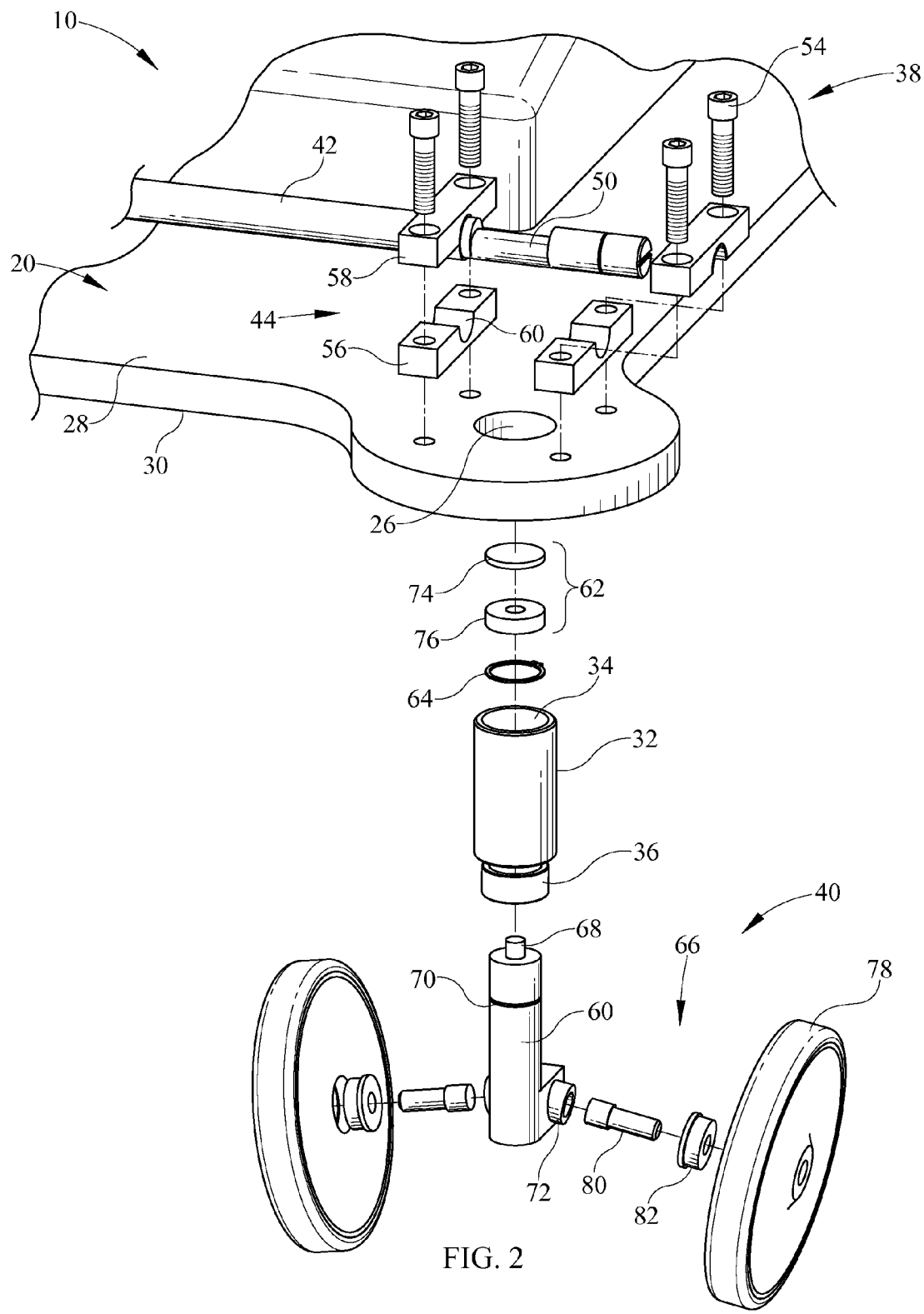
FIG. 2 is an exploded perspective view of the transport apparatus of FIG. 1.

A plurality of transport apparatuses 10 according to one embodiment of the current disclosure are shown in FIGS. 1 & 2. The transport apparatuses 10 can be used with many different apparatuses able to utilize a transport. However, for the sake of brevity the transport apparatuses 10 are shown as being used in conjunction with a patient support apparatus 12. The patient support apparatus 12 can include a head section H1, where the head of a patient (not shown) can be positioned, and a foot section F1, where the feet of a patient (not shown) can be positioned. The patient support apparatus 12 can include a plurality of transport apparatuses 10 and a frame 14 that can be supported by the plurality of transport apparatuses 10. It should be appreciated that in some illustrative embodiments the patient support apparatus 12 can support a mattress 16. The patient support apparatus 12 can contact a floor 18 or other support surfaces including, but not limited to, ceramic flooring, wood flooring, metal flooring, concrete flooring, rubber flooring or mats, carpeting, ramps, vehicle surfaces, dirt, gravel, concrete, grass, sand, mud, or other surfaces that can be encountered when moving the patient support apparatuses 12.

Figure 10:
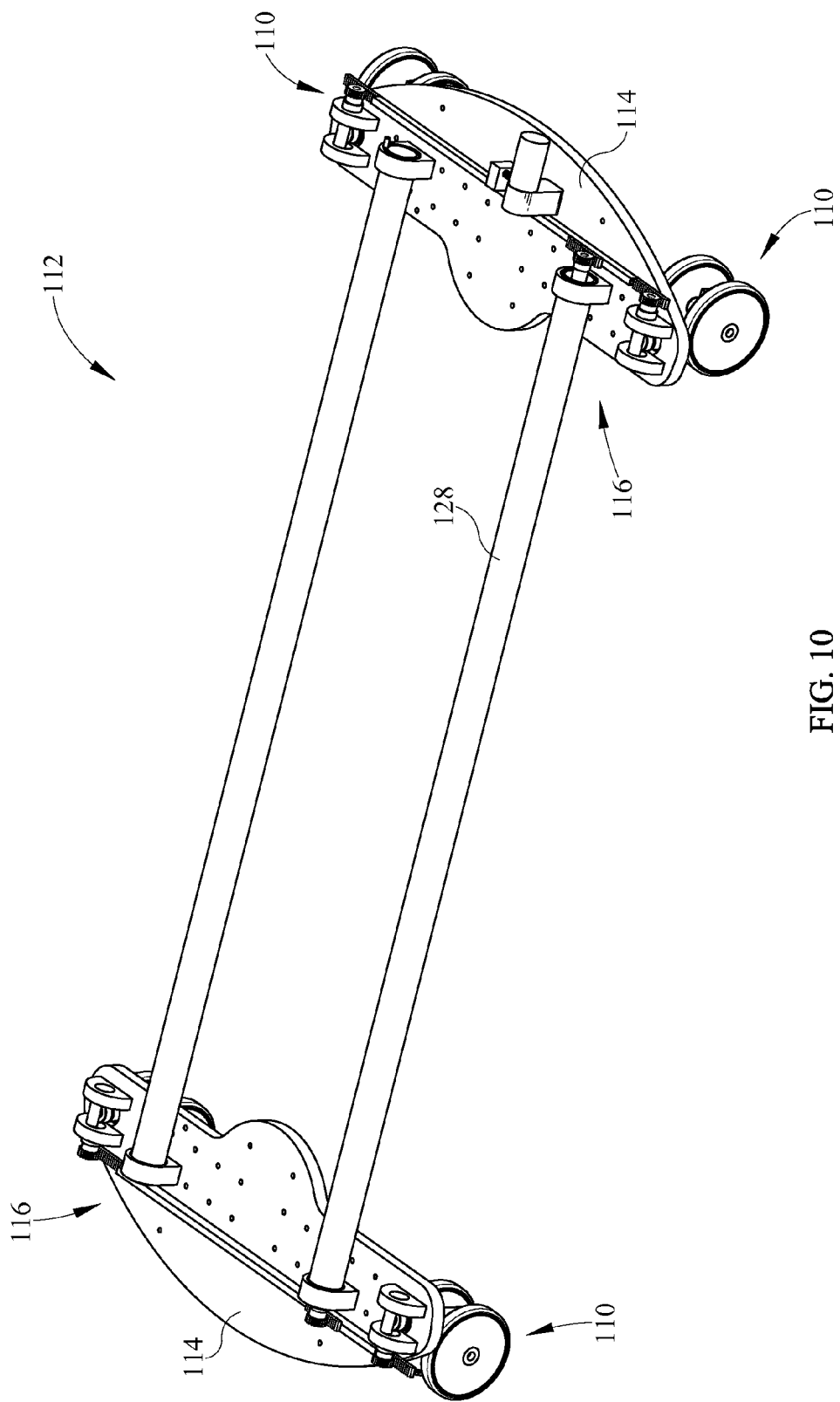
FIG. 10 is a perspective side view of a patient support apparatus including a plurality of transport apparatuses and a synchronizing system according to another illustrative embodiment.

The frame 14 can include a lower frame 20 and an upper frame 22 connected to the lower frame 20 by a frame linkage 24 as shown in FIG. 1. It should be appreciated that the frame linkage 24 can be a lift mechanism 24 configured to move the upper frame 22 with respect to the lower frame 20. It should also be appreciated that the upper frame 22 can be stationary with respect to the lower frame 20. It should further be appreciated that the lower frame 20 can comprise one or more sections as shown in FIG. 10.

The lower frame 20 can include a plurality of lower frame bores 26 proximate the corners of the lower frame 20, as shown in FIG. 2. The lower frame bores 26 can extend substantially perpendicularly between the upward facing surface 28 and the downward facing surface 30 of the lower frame 20. Each of the lower frame bores 26 can retain a cylindrical collar 32 therein. The collar 32 can include a collar bore 34 extending therethrough, and the collar 32 can extend above and/or below the upward facing surface 28 and the downward facing surface 30 of the lower frame 20, respectively. It should be appreciated that collar 32 can be flush with the upward facing surface 28 and/or the downward facing surface 30. It should also be appreciated that collar 32 can be integrally formed with lower frame 20 as shown in FIGS. 7 and 8.

The collar 32 can retain a radial bearing 36 within the collar bore 34 as shown in FIG. 2. The radial bearing 36 can be pressed within the collar bore 34 proximate the downward facing surface 30 of the lower frame 20. It should be appreciated that the radial bearing 36 can be retained within the collar bore 34 with an adhesive or retainer (not shown). The radial bearing 36 can rotatably engage a portion of the transport apparatuses 10 to maintain the concentric alignment of the transport apparatuses 10 with the collar bore 34 and can limit lateral movement.

At least one of the frame 14 and a portion of the transport apparatuses 10 can be moved with respect to one another between a first position or operating position and a second position or rotation resisting (brake) position. The transport apparatuses 10 can include an actuator assembly 38 and a caster assembly 40 as shown in FIG. 2. The actuator assembly 38 can include an actuating cam shaft 42 and a plurality of cam mounts 44. It should be appreciated that the actuator assembly 38 can alternatively include a linear actuator, a rotary actuator, a pneumatic actuator, a motor, a servomechanism, a hydraulic actuator, a manual crank, a lever, a foot pedal or other mechanical, electrical, or fluid actuation devices that can be configured to directly engage the caster assembly 40 or the cam shaft 42 to move the caster assembly 40 and/or the lower frame 20 with respect to one another. It should also be appreciated that the actuator assembly 38 can be configured to move the caster assembly 40 and/or the lower frame 20 with respect to one another by rotating the caster assembly 40 in a screw-like manner, for example, with respect to the lower frame 20.

Figure 9:
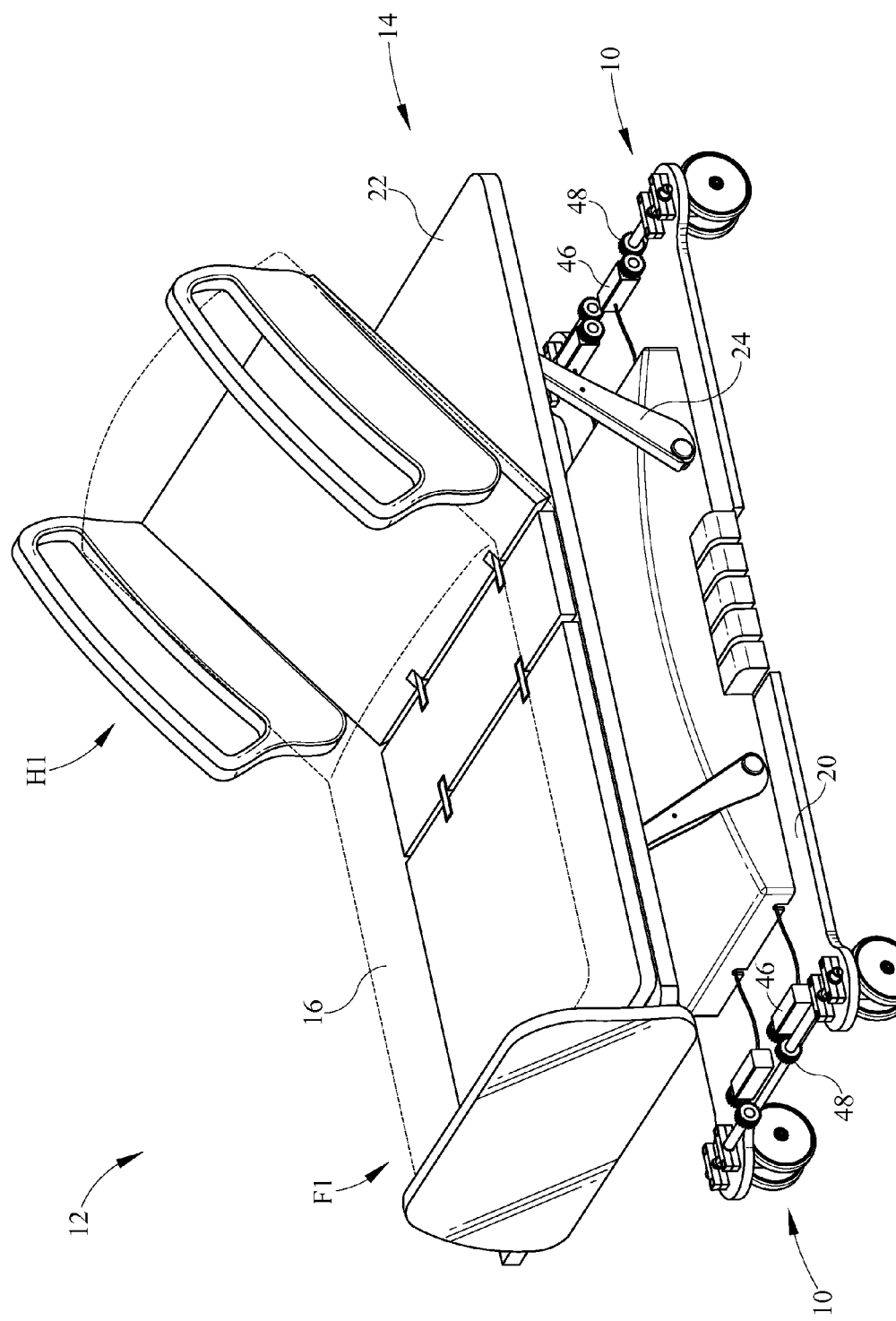
FIG. 9 is a perspective side view of a patient support apparatus including a plurality of transport apparatuses according to another illustrative embodiment where the transport apparatuses are individually engaged by a plurality of motors.

The cam shaft 42 can be rotatably retained within the cam mounts 44 and can extend between adjacent transport apparatuses 10 along the head section H1 and the foot section F1 of the lower frame 20, as shown in FIG. 1, to synchronize movement of the head section H1 and the foot section F1 lower frame 20 and/or transport apparatuses 10. It should be appreciated that in alternative embodiments the cam shaft 42 can operate a single transport apparatus 10, rather than extending between multiple apparatuses, in order to allow for independent operation of the transport apparatuses 10 as shown in FIG. 9. The cam shaft 42 can be rotated by a motor 46 coupled to the lower frame 20 that can engage a gear 48 coupled to the cam shaft 42 as shown in FIG. 1. It should be appreciated that multiple motors 46 can be utilized to independently and/or simultaneously rotate the cam shaft 42 of each actuator assembly 38 as shown in FIG. 10. It should also be appreciated that a manual crank, a wheel, a lever, foot pedal or other manual actuation mechanism (not shown) can be used to rotate the cam shaft 42 or can directly engage the caster assembly 40 to move the lower frame 20 and/or the caster assembly 40 with respect to one another.

The cam shaft 42 can include a recessed portion 50 that engages the caster assembly 40 to move the caster assembly 40 and/or the frame 14 with respect to one another as shown in FIG. 2. It should be appreciated that the cam shaft 42 can alternatively include a raised cam portion (not shown). It should also be appreciated that the cam shaft 42 can be a crankshaft (not shown) that can pivotably couple with a portion of the caster assembly 40. It should be further appreciated that the actuator assembly 38 can include an inclined plane (not shown) instead of or in addition to the cam shaft 42, or a similar device adapted to move the frame 14 and the caster assembly 40 with respect to one another. The recessed portion 50 can be a flat, cut-out portion or can be radially tapered according to the amount of control desired over the movement of the caster assembly 40 with respect to the frame 14. It should be appreciated that the recessed portion 50 can not be tapered uniformly and can include raised cam portions (not shown).

The cam mounts 44 can be coupled to the upward facing surface 28 of the lower frame 20 by a plurality of cam mount fasteners 52 as shown in FIG. 2. The plurality of cam mount fasteners 52 can be bolts, screws, pins, adhesive, welds or other such fasteners, compounds, or combinations thereof. The cam mounts 44 can include a lower cam mount 54 that can be coupled to the upward facing surface 28 of the lower frame 20, an upper cam mount 56 that can be coupled to the lower cam mount 54, and a cam mount bore 58 extending therethrough. It should be appreciated that the cam mounts 44 can be a single structure with a cam mount bore 58 extending at least partially therewithin. It should also be appreciated that the lower cam mount 54 can be integrally formed with the lower frame 20.

The cam mount bores 58 can rotatably retain the cam shaft 42 therewithin to maintain the alignment of the cam shaft 42 with respect to the lower frame bores 26 as shown in FIG. 2. In order to reduce the amount of friction between the cam shaft 42 and the cam mount bores 58, the cam mount 44 can be at least partially composed of a bearing quality material, such as, nylon or similar low resistance materials. It should be appreciated that the cam mount bores 58 can be lubricated with oil, grease, graphite, or other lubricants. It should also be appreciated that the cam mount bore 58 can include a cam mount bearing (not shown) or bearing sleeve (not shown) that can be retained therewithin.

The caster assembly 40 can be positioned proximate the downward facing surface 30 of the lower frame 20 as shown in FIG. 2. A portion of the caster assembly 40 can be positioned within the collar bore 34 and can engage the radial bearing 36. The caster assembly 40 can include a caster shaft 60 or yolk 60, a puck 62, a retainer 64, and a plurality of caster wheel assemblies 66. It should be appreciated that the caster assembly 40 can not include a puck 62 and the caster shaft 60 can directly engage the actuator assembly 38. The caster shaft 60 can include a pilot 68 at one end of the caster shaft 60, a retainer groove 70, and a caster wheel interface 72 at the other end of the caster shaft 60.

The puck 62 can be positioned between the actuator assembly 38 and the caster assembly 40 and can be movable within the collar bore 34 as shown in FIG. 2. The puck 62 can be substantially the same diameter as the inner diameter of the collar bore 34 and can slidably engage the recessed portion 50 of the cam shaft 42, the collar bore 34, and/or the caster shaft 60 to maintain the vertical and/or lateral orientation of the caster assembly 40 with respect to the frame 14. The puck 62 can include a backup plate 74 and a thrust bearing 76. It should be appreciated that the puck 62 can alternatively include only the thrust bearing 76 as shown in the alternative embodiments of FIGS. 5 & 8. It should also be appreciated that puck 62 can include one or more ball-bearings (not shown), wheels (not shown), or other rotating elements coupled with the caster shaft 60 that can directly engage the cam shaft 42. It should further be appreciated that the puck 62 can be a link (not shown) or a connecting rod (not shown) that can be movably coupled to the cam shaft 42 and/or the caster shaft 60. The pilot 68 can engage the thrust bearing 76 of the puck 62 such that a portion of the pilot 68 can be positioned within the thrust bearing 76 to maintain concentric alignment of the thrust bearing 76 and caster shaft 60 within the collar bore 34.

While the puck 62 and actuator assembly 38 can be one way of raising and lowering the frame 14 to engage and disengage the transport apparatus 10, many other embodiments are possible. For example, the transport apparatus 10 might be moved to the operating position by stepping on or otherwise actuating a locking mechanism (not shown) which can increase the spacing between the frame 14 and transport apparatus 10, such as, by forcing the caster assemblies 40 downward. The transport apparatus 10 could later be moved to the second position by disengaging the locking mechanism (not shown) to thereby allow the frame 14 to rest on the transport apparatus 10 and to provide frictional resistance between the frame 10 and transport apparatus 10, resisting movement of the transport apparatus 10 and subsequent movement of the patient support apparatus 12.

The retainer 64 can engage the retainer groove 70 and can be supported by a portion of the radial bearing 36 to removably retain the caster shaft 60 within the collar bore 34 as shown in FIG. 2. The retainer 64 can facilitate the quick installation and removal/replacement of the caster assemblies 40. It should be appreciated that the retainer 64 can be supported by a portion of the collar bore 34 to removably retain the caster shaft 60 within the collar bore 34. It should also be appreciated that the collar bore 34 can include a retainer groove (not shown) that slidably engages and supports the retainer 64 to removably retain the caster shaft 60 within the collar bore 34. It should be further appreciated that the collar bore 34 and the caster shaft 60 can include threads (not shown) that engage one another to retain the caster shaft 60 within the collar bore 34, which can negate the need for a puck 62 and/or radial bearing 36. The retainer 64 can be a rubber o-ring, a retaining clip, retaining pin, or other known retaining devices.

The caster wheel assembly 66 can include a plurality of caster wheels 78, a plurality of caster wheel shafts 80, and a plurality of caster wheel bearings 82 as shown in FIG. 2. It should be appreciated that the caster wheel assembly 66 can include only a single caster wheel 78, caster wheel shaft 80, and caster wheel bearing 82 as shown in FIGS. 7-8. It should also be appreciated that one or both of the caster wheel shafts 80 and the caster wheel bearings 82 can be integrally formed with the caster wheel interface 72, caster shaft 60, or the caster wheels 78.

The caster wheels 78 can include an engagement surface 84 that can engage the floor 18. The engagement surface 84 can include a first engagement side 86 and a second engagement side 88. The downward facing surface 30 of the lower frame 20 can frictionally contact one or both of the first engagement side 86 and the second engagement side 88.

The caster wheel shafts 80 can be coupled to the caster wheel interface 72 at an angle with respect to the caster shaft 60 to orient the caster wheels 78 such that they are at an angle with respect to the caster shaft 60 and the lower frame 20 as shown in FIG. 2. It should be appreciated that in alternative embodiments the caster wheel shafts 80 can be coupled to the caster wheel interface 72 perpendicularly with respect to the caster shaft 60 to orient the caster wheels 78 such that they are parallel with respect to the caster shaft 60 as shown in FIGS. 5 & 6. It should also be appreciated that a single caster wheel shaft 80 can be coupled with the caster wheel interface 72 perpendicularly or at an angle with respect to the single caster wheel 78 such that it is parallel or at an angle with respect to the caster shaft 60, respectively, as shown in FIGS. 7 & 8.

The angular orientation of the caster wheels 78 can assist in reducing the activation force required to move the patient support apparatus 12 from a stationary position. The angular orientation can also increase the pressure interface area between the caster wheels 78 and the floor 18, and can help prevent quaking of the caster wheels 78. Furthermore, the angular orientation can prevent damage to the portion of the caster wheels 78 that interfaces with the floor 18 since a different portion of the caster wheels 78 is frictionally engaged by the frame 18 to resist rotation of the caster wheels 78, which can result in affecting a brake application. It should be appreciated that a brake application can be affected, for example, through resistance of wheel 78 rotation or through resistance of movement of a transport apparatus 10.

When the transport apparatus 10 is in the operative position, the downward facing surface 30 of the lower frame 20 can be spaced apart from the engagement surface 84 a distance D1 as shown in FIGS. 3, 5, and 7. When the transport apparatus 10 is in the brake position, the downward facing surface 30 of the lower frame 20 can be frictionally contacting the engagement surface 84 as shown in FIGS. 4, 6, and 8. It should be appreciated that when the wheels 78 are at an angle with respect to the caster shaft 60 and the transport apparatus 10 is in the first or operative position, the downward facing surface 30 of the lower frame 20 can be spaced apart from the first engagement side 86 of the engagement surface 84 by the distance D1 as shown in FIG. 3. It should also be appreciated that when the wheels 78 are at an angle with respect to the caster shaft 60 and the transport apparatus 10 is in the brake position, the downward facing surface 30 of the lower frame 20 can be frictionally contacting the second engagement side 88 of the engagement surface 84 as shown in FIG. 4.

The caster wheel bearings 82 can couple with the caster wheel shafts 80 and can be removably retained within the caster wheels 78. It should be appreciated that the caster wheel bearings 82 can be integrally formed with the caster wheels 78 or the caster wheel shafts 80. The caster wheel bearings 82 can be radial bearings, thrust bearings, polymeric sleeves, or other bearing structures or materials adapted to withstand lateral and radial load bearing forces.

To install the transport apparatuses 10 in the frame 14, the caster assemblies 40 can be inserted into the collars 32 such that the caster shafts 60 and the retainers 64 are positioned within the collar bores 34 and retained therein by the engagement of the retainer 64 and the radial bearing 36. The installation can not require special tools. Since installation of the transport apparatuses 10 can occur upon delivery of the patient support apparatus 12 to a customer, transport apparatuses 10 and/or replacements thereof can be sold separately and/or shipped separately. Additionally, patient support apparatuses 12 can be shipped to customers without the transport apparatuses 10 installed therein to provide for additional space for more patient support apparatuses 12 to be included in the shipment.

Describing now the operation of these various illustrative embodiments, the transport apparatus 10 can be positioned initially in the operating position relative the frame 14 as shown in FIGS. 3, 5, and 7, such that the patient support apparatus 12 is freely movable with respect to the floor 18. In this position, the cam shafts 42 can be positioned at top-dead-center such that the puck 62 does not substantially engage the recessed portion 50 of the cam shafts 42, and the caster wheels 78 are spaced apart a distance D1 from the downward facing surface 30 of the lower frame 20. It should be appreciated that distance D1 can be the maximum distance between the caster wheels 78 and the downward facing surface 30 of the lower frame 20, and can differ depending on the orientation of the caster wheels 78 with respect to the caster shaft 60 and the configuration of the recessed portion 50 of the cam shafts 42.

To resist rotation of the caster wheels 78, which can result in affecting a brake application, the cam shafts 42 can be rotated from approximately top-dead-center to approximately bottom-dead center by the motor 46 engaging the gear 48 to move the transport apparatus 10 to a second position or rotation resisting (brake) position with respect to the frame 14 as shown in FIGS. 4, 6, and 8. As the cam shafts 42 rotate, the puck 62 can slidably engage the recessed portion 50 of the cam shafts 42 and move the lower frame 20 and the caster wheels 78 toward one another, thereby decreasing the distance D1 therebetween. Once the cam shafts 42 are at approximately bottom-dead-center, the downward facing surface 30 of the lower frame 20 can be frictionally engage the engagement surface 84 of the caster wheels 78, thereby resisting rotation of the caster wheels 78, which can result in affecting a brake application.

Figure 11:
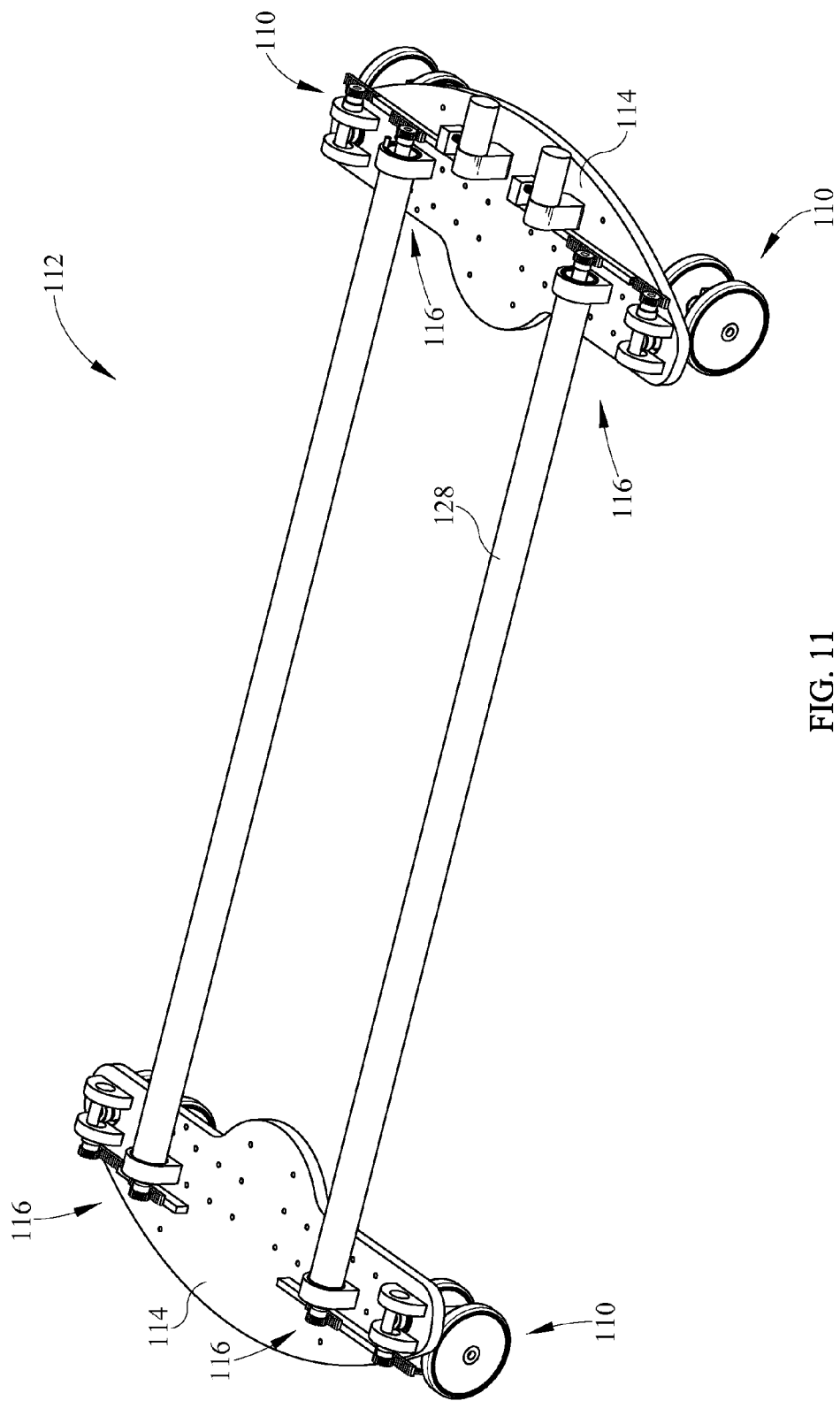
FIG. 11 is a perspective side view of the patient support apparatus of FIG. 10 including a synchronizing system according to another illustrative embodiment.
Figure 12:
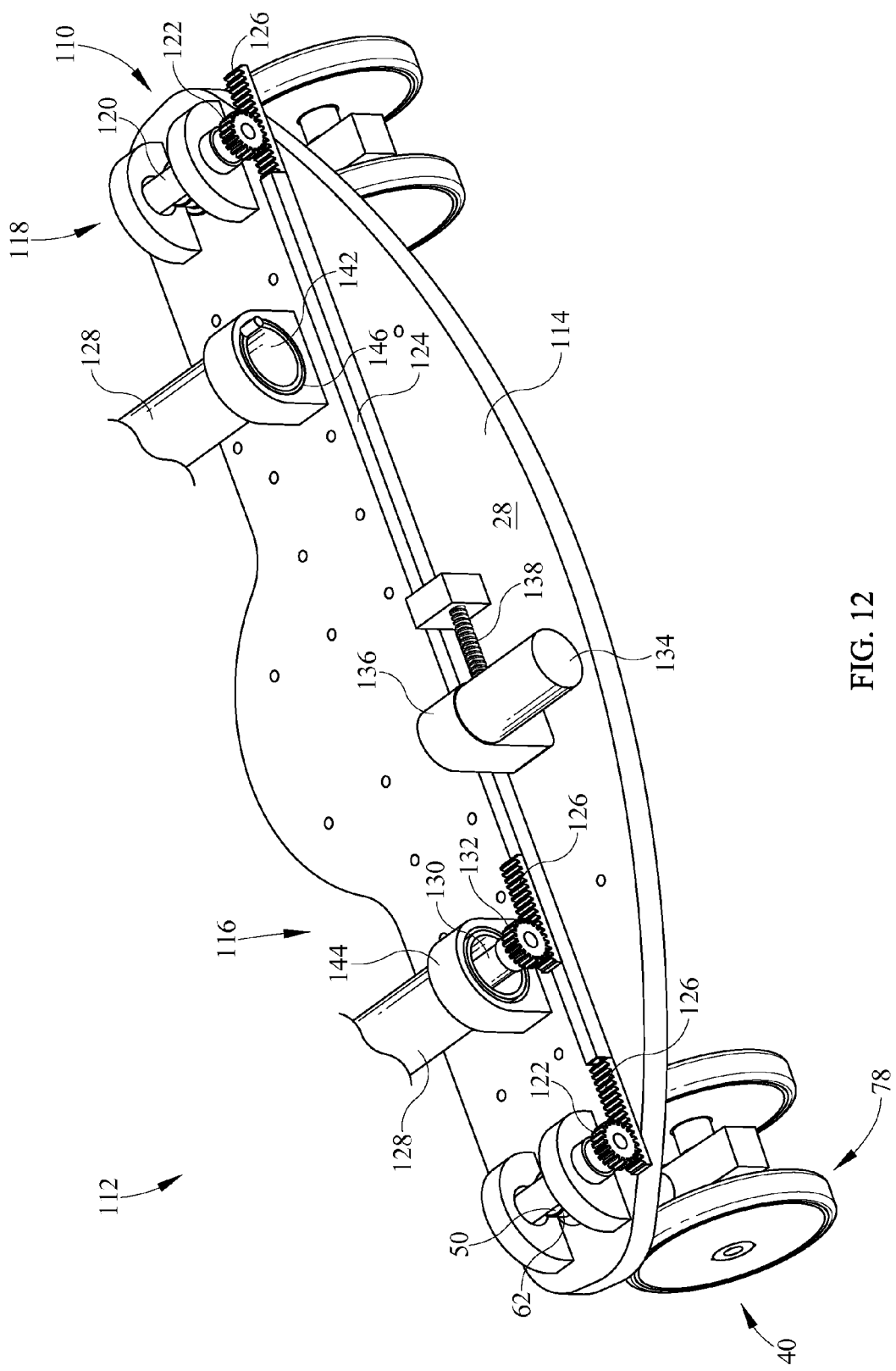
FIG. 12 is a perspective front view of the transport apparatuses and synchronizing system of FIG. 10 engaged by the motor according to another illustrative embodiment.

A transport apparatus 110 according to another illustrative embodiment of the current disclosure is depicted FIGS. 10-13. A patient support apparatus 112 can include a plurality of transport apparatuses 110, a lower frame 114, and a synchronizing system 116. The synchronizing system 116 can synchronize the movement of the transport apparatuses 110 so that the downward facing surface 30 of the lower frame 114 can engage the engagement surface 84 of the transport apparatuses 110 simultaneously. It should be appreciated that the synchronizing system 116 can be used to synchronize the movement of four transport apparatuses 110 as shown in FIG. 10. It should also be appreciated that the synchronizing system 116 can be used to synchronize two of the transport apparatuses 110 as shown in FIG. 11.

The transport apparatuses 110 can include an actuator apparatus 118, a puck 62, and a caster assembly 40 as shown in FIGS. 10-13. The actuator apparatus 118 can include a cam shaft 120 and a plurality of cam mounts 44 coupled to the upward facing surface 28 of the lower frame 114. The cam shaft 120 can be rotatably retained within a cam mount bore 58 of the cam mounts 44. One end of the cam shaft 120 can include a cam shaft gear 122 mounted thereon that can engage the synchronizing system 116. It should be appreciated that the end of the cam shaft 120 can include teeth (not shown) formed therein instead of the gear 122.

The synchronizing system 116 can include a rack 124 or longitudinal member 124 that can have teeth 126 thereon, a plurality of tubular longitudinal members 128, and a synchronizing shaft 130 that can include a synchronizing gear 132 mounted thereon and that can be positioned within one of the longitudinal members 128 as shown in FIGS. 10-13. The plurality of longitudinal members 124 can extend between sections of the lower frame 114. It should be appreciated that the lower frame 114 can be a single lower frame 114 section with longitudinal members 124 extending there along.

The rack 124 can extend between a pair of transport apparatuses 110 and can slidably engage the upward facing surface 28 of the lower frame 114 such that the rack 124 can be substantially perpendicular the cam shafts 120 and/or the longitudinal members 128 as shown in FIGS. 10-13. It should be appreciated that the rack 124 can engage a channel (not shown) in the lower frame 114 to maintain the substantially perpendicular orientation of the rack 124 with respect to the cam shafts 120 and/or the longitudinal members 128. The teeth 126 can engage the cam shaft gears 122 that can be coupled to the cam shafts 120 and/or synchronizing gears 132 that can be coupled to the synchronizing shaft 130.

Figure 13:
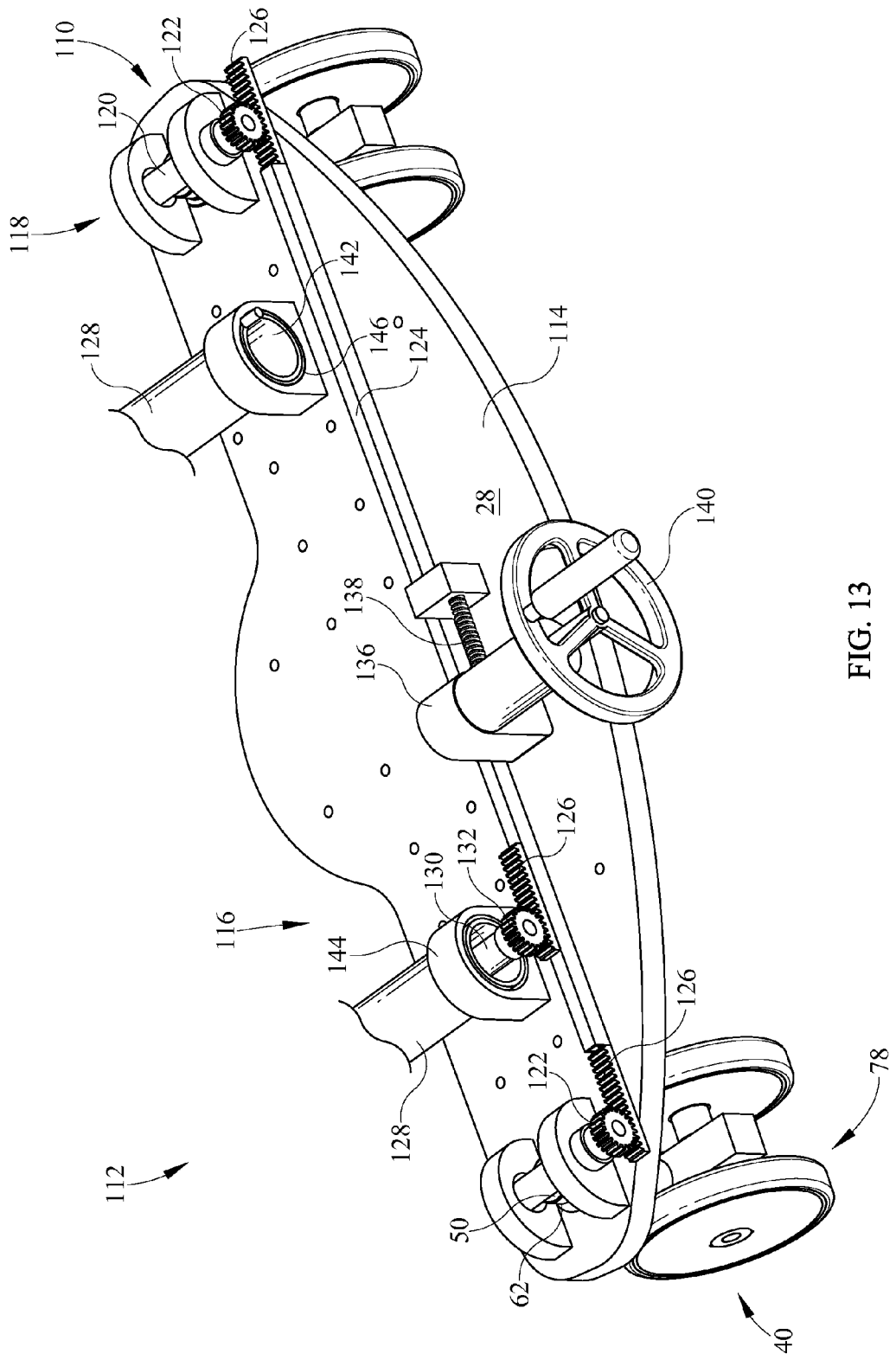
FIG. 13 is a perspective front view of the transport apparatuses and synchronizing system of FIG. 10 engaged by a manual crank according to another illustrative embodiment.

The rack 124 can be moved between the pair of transport apparatuses 110 by a motor 134 that can be coupled to the lower frame 114 by a motor mount 136 as shown in FIGS. 10-13. The motor 134 can engage a motor gear 138 that can be coupled to the rack 124. It should be appreciated that the rack 124 can be moved between the pair of transport apparatuses 110 by a manual crank 140 as shown in the embodiment of FIG. 13, a lever, a wheel, a cam, a foot pedal, or other manual actuation devices or combinations thereof. It should also be appreciated that the rack 124 can be moved between the pair of transport apparatuses 110 by a linear actuator, a rotary actuator, a pneumatic actuator, a servomechanism, a hydraulic actuator, or other mechanical, electrical, or fluid actuation devices or combinations thereof.

The longitudinal members 128 can include a longitudinal member bore 142 that can extend between the lower frame 114 sections as shown in FIGS. 10-13. The longitudinal members 128 can be coupled to the lower frame 114 sections by longitudinal member mounts 144. Longitudinal member mounts 144 can include a longitudinal member mount bore 146 that can retain the longitudinal members 128 therein. It should be appreciated that the longitudinal members 128 can rotate with respect to the longitudinal member mounts 144. Longitudinal member mounts 144 can be coupled to the upward facing surface 28 of the lower frame 114 with fasteners (not shown). It should be appreciated that the longitudinal member mounts 144 can be coupled to the upward facing surface 28 with adhesive or integrally formed with the lower frame 114.

The synchronizing shaft 130 can extend through one of the longitudinal members 128 and between the racks 124 located on both of the lower frame 114 sections as shown in FIGS. 10-13. The synchronizing shaft 130 can be positioned generally concentrically within the longitudinal member 128 and can rotate with respect to the longitudinal member 128. It should be appreciated that longitudinal members 128 can include at least one radial bearing (not shown) that can be positioned within the longitudinal member bore 142 to concentrically locate the synchronizing shaft 130 and facilitate rotation thereof. It should also be appreciated that the longitudinal members 128 can include a bearing sleeve (not shown) or can be lubricated with oil, grease, graphite, or other low-friction lubricants.

In operation, the transport apparatuses 110 on both of the lower frame 114 sections can be initially positioned in the operating position relative the lower frame 114 such that the patient support apparatus 112 is freely movable with respect to the floor 11, which can be similar to the first position shown in FIGS. 3, 5, & 7. In this position, the cam shafts 120 can be positioned at approximately top-dead-center such that the pucks 62 do not substantially engage the recessed portions 50 of the cam shafts 120, and the caster wheels 78 are spaced apart a distance D1 from the downward facing surface 30 of the lower frame 114.

To resist rotation of the caster wheels 78, which can result in affecting a brake application, the cam shafts 120 can be rotated from approximately top-dead-center to approximately bottom-dead center by the motor 134 coupled to one of the sections of the lower frame 114 to move at least one of the transport apparatuses 110 and the lower frame 114 with respect to one another to the brake position, which can be similar to the second position shown in FIGS. 4, 6, and 8. The motor 134 can rotate a motor gear 138 coupled with the rack 124 to move the rack 124 with respect to the transport apparatuses 110. As the rack 124 moves with respect to the cam shafts 120 and longitudinal members 128, the teeth 126 can cause the cam shaft gears 122 and the synchronizing gears 132 to rotate. Rotation of the cam shaft gears 122 and the synchronizing gears 132 can cause the cam shafts 120 and synchronizing shaft 130 to rotate.

As the synchronizing shaft 130 rotates, the synchronizing gear 132 mounted on the other end of the synchronizing shaft 130 that engages the rack 124 and slidably engages the other section of the lower frame 114 can rotate. The rotation of the synchronizing gear 132 can cause the rack 124 to move with respect to the transport apparatuses 110 coupled to the second section of the lower frame 114. The teeth 126 on the rack 124 can engage and cause the cam shaft gears 122 to rotate, which can cause the cam shafts 120 to rotate. As the cam shafts 120 are rotated, the puck 62 can slidably engage the recessed portion 50 of the cam shaft 120 and move at least one of the lower frame 114 and the caster wheels 78 toward one another, thereby reducing the distance D1 therebetween. Once the cam shaft 120 is at approximately bottom-dead-center, the downward facing surface 30 of the lower frame 114 can be frictionally engaged with the caster wheels 78, thereby resisting rotation of the caster wheels 78, which can result in affecting a brake application.

Figure 14:
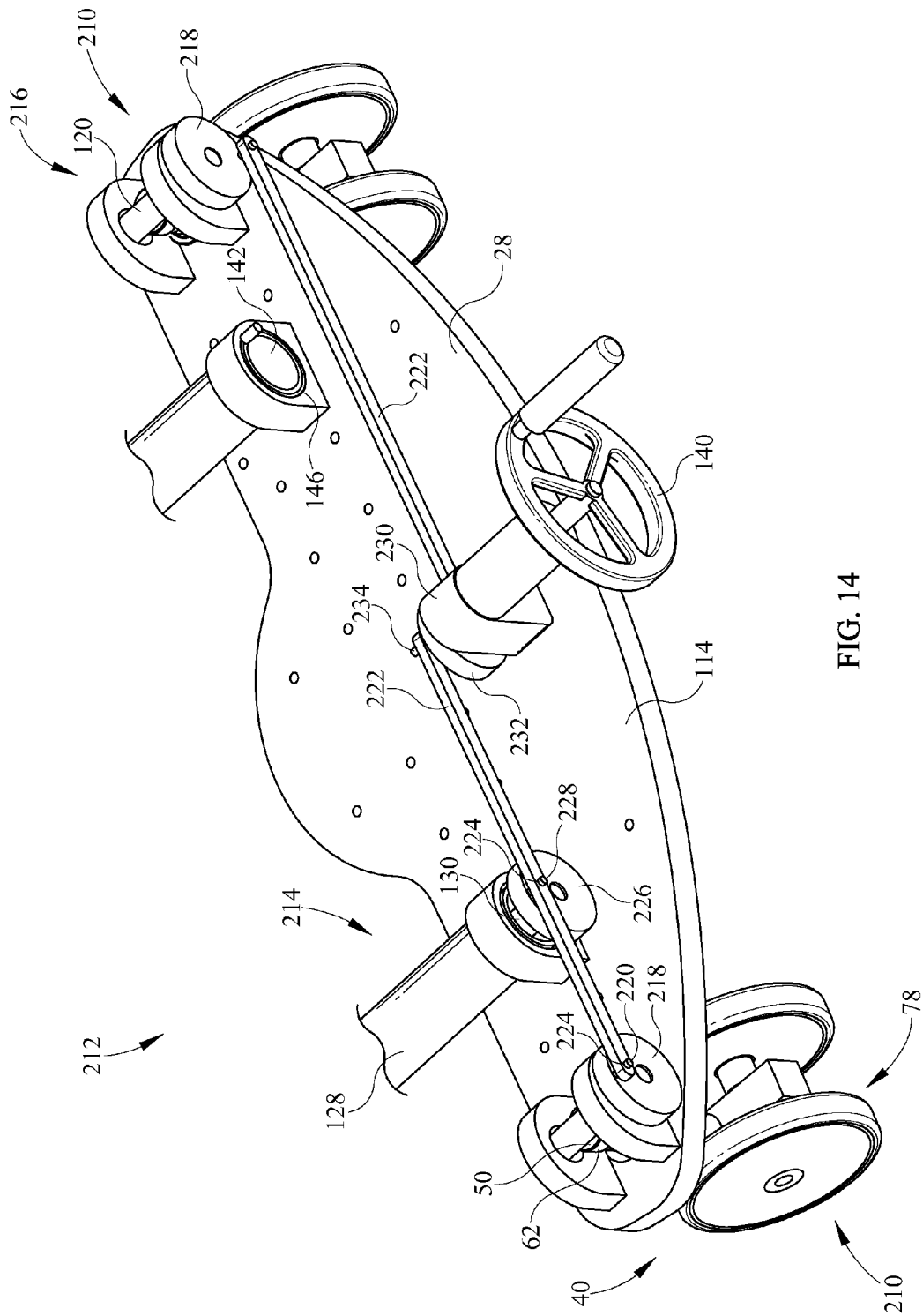
FIG. 14 is a perspective front view of the transport apparatuses and synchronizing system of FIG. 10 with a manual crank engaging link arms according to another illustrative embodiment.

A transport apparatus 210 according to yet another illustrative embodiment of the current disclosure is shown in FIG. 14. A patient support apparatus 212 can include a plurality of transport apparatuses 210, a lower frame 114, and a synchronizing system 214.

The transport apparatuses 210 can include an actuator apparatus 216, a puck 62, and a caster assembly 40 as shown in FIG. 14. The actuator apparatus 216 can include a cam shaft 120 and a plurality of cam mounts 44 that can be coupled to the upward facing surface 28 of the lower frame 114. One end of the cam shaft 120 can include a cam shaft gear 218 mounted thereon that can engage the synchronizing system 214. The cam shaft gears 218 can be generally circular and can include a pin 220 that can protrude from the surface of the cam shaft gears 218 proximate the edges of the cam shaft gears 218.

The synchronizing system 214 can include a plurality of links 222 with a plurality of pin holes 224 therein, a plurality of longitudinal members 128 that can extend between the sections of the lower frame 114, and a synchronizing shaft 130 that can have a synchronizing gear 226 with a pin 228 as shown in FIG. 14. The pin holes 224 can engage the pins 220,228 and can removably couple the links 222 to the cam shaft gears 218 and the synchronizing gears 226. It should be appreciated that the pins 220,228 can be retained within the pin holes 224. The pin holes 224 can be generally located proximate the ends and centers of the links 222. It should be appreciated that the pin holes 224 can be located anywhere along the links 222 to engage the pins 220,228.

The links 222 can be moved by a manual crank 140 coupled to the lower frame 114 by a crank mount 230. The crank 140 can engage a crank gear 232 with pins 234 that can couple the crank gear 232 to the links 222 as shown in FIG. 14. It should be appreciated that the links 222 can be moved by a motor 134, a pneumatic linear actuator, a pneumatic rotary actuator, a motor, a servomechanism, a hydraulic cylinder, or other mechanical, electrical, or fluid actuation devices, or combinations thereof. It should also be appreciated that the links 222 can be moved by a lever, a cam, a foot pedal or other manual actuation devices or combinations thereof.

In operation, the transport assemblies 210 on both of the lower frame 114 can be initially positioned in the operating position relative the lower frame 114 such that the patient support apparatus 212 is freely movable with respect to the floor 18, which can be similar to the first position shown in FIGS. 3, 5, & 7. In this position, the cam shafts 120 can be positioned at approximately top-dead-center such that the pucks 62 do not substantially engage the recessed portions 50 of the cam shafts 120, and the caster wheels 78 are spaced apart a distance D1 from the downward facing surface 30 of the lower frame 114.

To resist rotation of the caster wheels 78, which can result in affecting a brake application, the cam shafts 120 can be rotated from approximately top-dead-center to approximately bottom-dead center by the manual crank 140 coupled to one section of the lower frame 114 to move at least one of the transport apparatuses 210 and the lower frame 114 with respect to one another to the brake position with respect to the lower frame 114, which can be similar to the second position shown in FIGS. 4, 6, and 8. The manual crank 140 can rotate the crank gear 232 coupled with the links 222 to move the links 222 between the transport apparatuses 210. As the links 222 move, the cam shaft gears 218 and the synchronizing gear 226 can rotate, thereby causing the cam shafts 120 and synchronizing shaft 130 to rotate.

As the synchronizing shaft 130 rotates, the synchronizing gear 226 engaging the other set of links 222 proximate the other section of the lower frame 114 can rotate. The rotation of the synchronizing gear 226 can cause the links 222 to move between the transport apparatuses 210 coupled to the other section of the lower frame 114. The pins 220,228 engaging the pin holes 224 of the links 222 can be moved as the links 222 move, thereby causing the cam shafts 120 to rotate. As the cam shafts 120 are rotated, the puck 62 can begin to slidably engage the recessed portion 50 of the cam shaft 120 and move at least one of the lower frame 114 and the caster wheels 78 with respect to one another. Once the cam shaft 120 is at approximately bottom-dead-center, the downward facing surface 30 of the lower frame 114 can be frictionally engaged with the caster wheels 78, thereby resisting rotation of the caster wheels 78, which can result in affecting a brake application.

Many other embodiments of the present disclosure are also envisioned. For example, an apparatus 12, 112, 212 comprises a frame 14 and a transport assembly 10, 110, 210 supporting the frame 14. The transport assembly 10, 110, 210 is configured to selectively move relative to the frame 14 between a transport position and a brake position. A portion of the frame 14 frictionally engages a portion of the transport assembly 10, 110, 210 in the brake position to affect a brake application that resists the transportation of the frame 14. The portion of the frame 14 is disengaged from the portion of the transport assembly 10, 110, 210 in the transport position to allow for transportation of the frame 14.

In another example, a patient support apparatus 12, 112, 212 comprises a frame 14, an actuator assembly 38, 118, 216, and a caster assembly 40. The actuator assembly 38, 118, 216 is coupled to the frame 14. The caster assembly 40 supports the frame 14. A portion of the actuator assembly 38, 118, 216 is configured to move at least one of the caster assembly 40 and the frame 14 relative one another to at least one of engage and disengage a portion of the caster assembly 40 and a portion of the frame 14 to selectively resist rotation of a portion of the caster assembly 40 with respect to the frame 14.

In yet another example, a support apparatus 12, 112, 212 including a frame 14 supported by a transport apparatus 10, 110, 210 is contacted. The transport apparatus 10, 110, 210 includes a rotational element 78 and is in a first position relative the frame 14. The transport apparatus 10, 110, 210 is moved from the first position to a second position relative the frame 14. The rotational element 78 of the transport apparatus 10, 110, 210 is frictionally engaged by the frame 14 in the second position to resist rotation of the rotational element 78.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding. It should be understood that while the use of the word preferable, preferably or preferred in the description above indicates that the feature so described can be more desirable, it nonetheless can not be necessary and embodiments lacking the same can be contemplated as within the scope of the disclosure, that scope being defined by the claims that follow. In reading the claims it is intended that when words such as "a," "an," "at least one," "at least a portion" are used there is no intention to limit the claim to only one item unless specifically stated to the contrary in the claim. When the language "at least a portion" and/or "a portion" is used the item can include a portion and/or the entire item unless specifically stated to the contrary. While embodiments of the disclosure have been illustrated and described in detail in the drawings and foregoing description, the same are to be considered as illustrative and not restrictive in character, it being understood that only the selected embodiments have been shown and described and that all changes, modifications and equivalents that come within the spirit of the disclosure as defined herein or by any of the following claims are desired to be protected.

What is claimed is:

1. An apparatus comprising:
    a frame, and
    a transport assembly supporting the frame, the frame being configured to selectively move relative to the transport assembly between a transport position and a brake position, the transport assembly including a rotational element comprising a first engagement surface and a second engagement surface adjacent to the first engagement surface, the first engagement surface and the second engagement surface both extend along the entire circumference of the rotational element, the first engagement surface being configured to engage the floor and the second engagement surface being configured to frictionally engage the frame in the brake position and be disengaged from the frame in the transport position.

2. The apparatus of claim 1, wherein the rotational element includes a wheel and the first engagement surface extends along a first circumferential edge of the wheel and the second engagement surface extends along a second circumferentially edge of the wheel.

3. The apparatus of claim 1, wherein the second engagement surface does not engage the floor.

4. A patient support apparatus comprising:
    a lower frame,
    a lift mechanism coupled to the lower frame;
    an upper frame coupled to the lift mechanism and movable with respect to the lower frame in response to the movement of the lift mechanism;
    an actuator assembly coupled to the frame,
    and a caster assembly supporting the frame and configured to movably engage the frame and the actuator assembly, the actuator assembly is configured to cooperate with the caster assembly and frame to selectively allow the frame to move relative to the caster assembly between a first position and a second position, a portion of the caster assembly being frictionally engaged by a portion of the frame to resist rotation of the portion of the caster assembly in the first position and the portion of the caster assembly being disengaged from the portion of the frame in the second position.

5. The apparatus of claim 4, wherein the actuator assembly includes a cam shaft that rotatably engages the portion of the caster assembly to move the caster assembly with respect to the frame as the cam shaft is rotated, the cam shaft including at least one of a recessed portion and a raised portion that engages the caster assembly.

6. The apparatus of claim 4, wherein the transport assembly includes a rotational element with an engagement surface, wherein the engagement surface is configured to contact a support surface in the transport position and wherein the engagement surface is configured to frictionally contact the portion of the frame and the support surface in the brake position.

7. The apparatus of claim 6, wherein the rotational element is aligned angularly with respect to the frame, and wherein the engagement surface includes a first portion and a second portion, the first portion of the engagement surface being configured to contact the support surface and the second portion of the engagement surface being configured to frictionally contact the portion of the frame, the first portion and the second portion are different portions of the engagement surface.

8. The apparatus of claim 7, wherein the first portion does not contact the frame in the brake position and the second portion does not contact the support surface in the transport position.

9. A patient support apparatus comprising:
    a frame,
    a non-elastic biasing assembly coupled to the frame,
    and a caster assembly supporting the frame and configured to movably engage the frame and the non-elastic biasing assembly, the non-elastic biasing assembly, when actuated, is configured to cooperate with the caster assembly and frame to selectively allow the frame to move the frame relative to the caster assembly between a first position and a second position, a portion of the caster assembly being frictionally engaged by a portion of the frame to resist rotation of the portion of the caster assembly in the first position and the portion of the caster assembly being disengaged from the portion of the frame in the second position.

10. The patient support apparatus of claim 9, wherein the caster assembly includes a caster shaft and a wheel coupled to the caster shaft, wherein the wheel is substantially parallel to a portion of the caster shaft.

11. The patient support apparatus of claim 9, wherein the caster assembly includes a caster shaft and a wheel coupled to the caster shaft, wherein the wheel is at an angle with respect to the caster shaft, the wheel including an engagement surface wherein a first portion of the engagement surface is configured to contact a floor and a second portion of the engagement surface is configured to frictionally contact the portion of the frame, the first portion and the second portion are different portions of the engagement surface.

12. The patient support apparatus of claim 11, wherein the first portion is along an edge of the engagement surface and the second portion is along another edge of the engagement surface wherein the first portion does not contact the frame and the second portion does not contact the floor.

13. The patient support apparatus of claim 9, wherein the frame includes a bore, a portion of the caster assembly being positioned within the bore, a retaining element being configured to couple with the portion of the caster assembly positioned within the bore and configured to couple with a portion of the bore to removably retain the portion of the caster assembly within the bore.

14. The patient support apparatus of claim 9, wherein the non-elastic biasing includes a non-elastic biasing selected from the group of non-elastic biasing consisting of a pneumatic actuator, a linear actuator, a rotary actuator, a hydraulic actuator, a motor, a servomechanism, a manual crank, a lever, and a foot pedal.

15. The patient support apparatus of claim 9, wherein the non-elastic biasing assembly includes a cam shaft, a portion of the cam shaft includes at least one of an area recessed from the surface of the cam shaft and an area raised from the surface of the cam shaft, the portion of the cam shaft being adapted to engage a portion of the caster assembly to move at least one of the frame and the caster assembly from the first position to the second position with respect to one another.

16. The patient support apparatus of claim 9 further comprising a synchronization system including:
a longitudinal member;
a first gear coupled to an end of the non-elastic biasing assembly;
and second gear coupled to an end of a second actuator assembly engaging a second caster assembly, the first gear and the second gear engaging the longitudinal member to coordinate movement of the caster assembly, the second caster assembly, and the frame with respect to one another.

17. The patient support apparatus of claim 16 further comprising:
a second longitudinal member;
a synchronizing member extending between about the longitudinal member and the second longitudinal member;
and a third gear coupled with an end of the synchronizing member, the third gear engaging the second longitudinal member, the synchronizing member being configured to coordinate movement of the caster assembly, the second caster assembly, a third caster assembly, and the frame with respect to one another.

18. The patient support apparatus of claim 16, wherein the longitudinal member slidably engages the frame and includes a plurality of teeth disposed over a portion of the longitudinal member, the teeth configured to engage the first gear and second gear.

19. The patient support apparatus of claim 16, wherein the longitudinal member includes a plurality of holes therein and the first gear and second gear include pins extending therefrom that are configured to engage the holes to couple the first gear and second gear to the longitudinal member.

* * * * *